March 18, 1952 O. DENNY, SR 2,589,680
TRANSPARENCY HOLDER ATTACHMENT FOR PHOTOGRAPHIC ENLARGERS
Filed Aug. 9, 1949
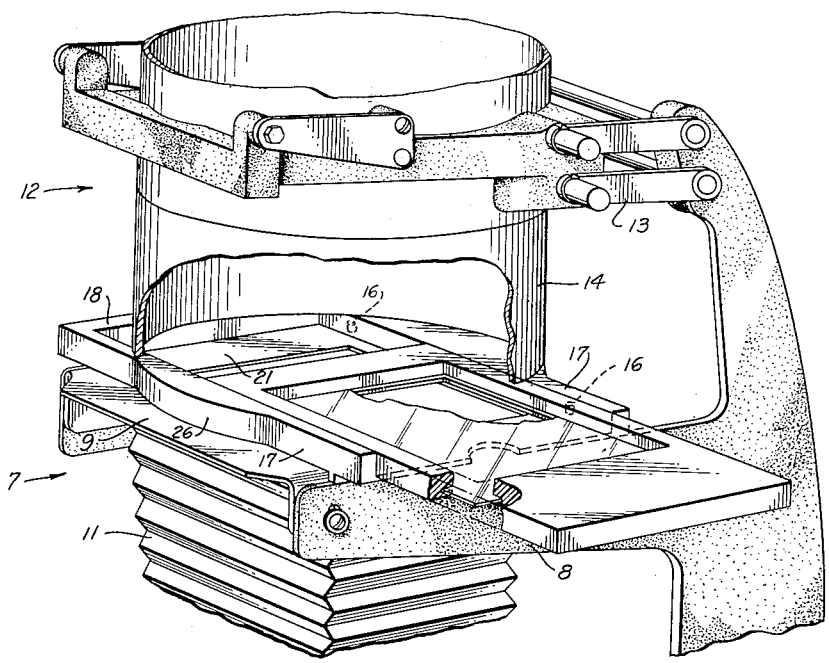
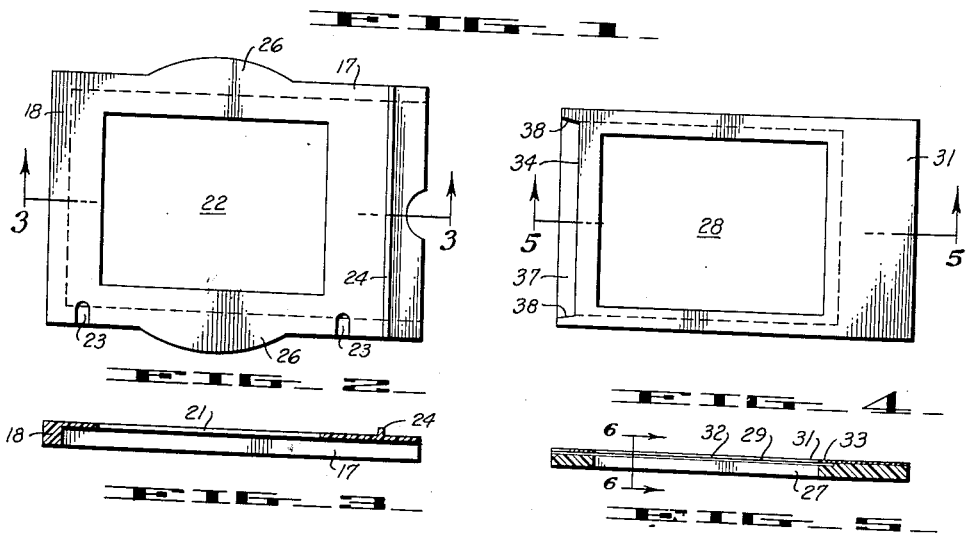
INVENTOR.
ORRIN DENNY, SR.

Patented Mar. 18, 1952

2,589,680

UNITED STATES PATENT OFFICE 2,589,680

TRANSPARENCY HOLDER ATTACHMENT FOR PHOTOGRAPHIC ENLARGERS

Orrin Denny, Sr., Oakland, Calif.

Application August 9, 1949, Serial No. 109,303

1 Claim. (Cl. 88—24)

This invention relates to slide-type cut film or plate carriers for image projection devices such as photographic enlargers.

An object of the invention is to provide a unit for attachment to a conventional photographic projection enlarger by means of which negatives or copy film or plates may be readily inserted in and removed from the enlarger without disturbance of any of the operating parts of the latter.

Another object of the invention is to provide an attachment of the character described which is capable of accommodation by the average photographic enlarger without requiring any structural changes or rearrangements of the latter.

A further object of the invention is to provide an attachment unit of the class referred to which is constructed of a minimum number of cooperative parts conducive to economy of manufacture and maximum ease and simplicity of operation.

Still another object of the invention is to provide an attachment unit of the aforementioned type which is capable of effecting adequate dissipation of heat absorbed from the superposed enlarger lamp house so as to lessen the chances of possible warpage or slight positional displacements of the negative or other transparency being held by the unit.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claim.

Referring to the drawing:

Figure 1 is a portional perspective view of a conventional photographic enlarger mechanism showing the improved holder of my invention associated therewith. Portions of the view are broken away so as to show internal details of construction more clearly.

Figure 2 is a reduced scale bottom plan view of the slide member receiving frame.

Figure 3 is a vertical sectional view taken in the plane indicated by the line 3—3 of Figure 2.

Figure 4 is a bottom plan view of the slide member.

Figure 5 is a vertical sectional view taken in the plane indicated by the line 5—5 of Figure 4.

Figure 6 is an enlarged scale vertical sectional view taken in the plane indicated by the line 6—6 of Figure 5.

In many conventional types of photographic enlargers capable of axially vertical projection, the lower focusing unit, comprising the bellows and projection lens, is capable of being fixed relative to and above the projection surface, the superposed lamp house, between which and the subjacent focusing unit the negative to be projected is placed, being arranged to be moved vertically so that the negative holder may be inserted and removed from the enlarger. The negative holder generally used comprises a pair of comparatively thin metal plate members, suitably apertured to mask all but the projection area of the negative, which may be superposed one above the other with the negative therebetween and inserted as a unit between the focusing and lamp house units, the latter being then lowered to confine the holder in place while the enlargement projection is being made. Where a large number of single exposures are being made from a group of negatives, the constant raising and lowering of the lamp house, together with removals and replacements of the negative holder, not to mention the extra operations required load and unload the latter, can become tiresome and can further greatly retard production speed. In addition, due possibly to fatigue or carelessness on the part of the operator in the haste to maintain production speed, the accidental forceful dropping of the lamp house may cause positional disturbance of the subjacent fixed focusing unit with the result that slight but noticeable deviation from critical sharpness in the projected image may result, requiring the operations be halted until correct focusing may be reestablished. Furthermore, it is quite possible to inadvertently raise the lamp house while the projection lamp is still energized with the result that any sensitized paper which may be exposed in the normally darkened room and reached by the liberated light rays may be badly fogged or ruined.

I have provided an improved receiver attachment operable in combination with a special holder for cut film or plate negatives or with a conventional plate holder by means of which the enlarger, when once set, may be repeatedly loaded and unloaded without the necessity of disturbing any parts of the enlarger proper. In Figure 1 I have illustrated sufficient structure of a conventional enlarger to indicate the cooperative relationship with the latter of the improved attachment of my invention. Such an enlarger usually has a lower focusing unit, generally indicated by the numeral 7, connected with the vertically adjustable carrier frame 8, of which the planar horizontal backing plate 9 and subjacent bellows 11 are shown. The lower portion of the lamp house unit 12 superposed above the backing plate 9 is carried by parallel levers 13 pivotally connected with the frame 8 so that the former is maintained in vertical perpendicularity during raising and lowering thereof and the lower extremity of the unit 12 has thereon a light confining skirt 14 between the lower edge of which the upper face of the plate 8 the plate or negative holder is adapted to be confined. Upwardly projecting pins 16 secured to the face plate are arranged to be engaged in suitable apertures provided in the conventional plate holder by means of which the latter may be repeatedly precisely positioned on the face plate.

The improved plate attachment of my invention, which is interchangeable with the conventional negative or plate holder, comprises a receiving frame constructed preferably as an integral unit of any of the hard-setting, light-impervious resinoids commonly classed as plastics, a principal requirement being that the material be substantially opaque. Specifically, the receiving frame is generally rectangular, being formed with relatively spaced and parallel side rails 17 interconnected at one end by a laterally extending end rail 18, the side rails at the other end thereof being joined by a transverse web portion 19. Each of the side and end rails 17 and 18 has on the inner side thereof a lip 21 extending inwardly from the external margins of the frame and coplanar with the web 19 so as to border and define a preferably rectangular central light-transmission opening 22 in the receiving frame, which opening, when the frame is properly operatively positioned on the backing plate 8, is registered with the axis of the light transmission path from the lamp house unit 12 to the focusing unit 7. Means for precisely positioning the receiving frame on the backing plate are provided and comprise, as is best shown in Figures 2 and 3, spaced notches 23 formed in one of the side rails 17 and engageable with the locating pins 16, a downwardly projecting and transversely extending rib 24 being further provided on the frame which is engageable with a side surface of the backing plate 8. The procedure of mounting the receiving frame on the backing plate is to lay the former on the latter, move the receiving frame until the rib 24 engages the side of the backing plate and then slide the receiving frame horizontally at right angles until the notches 23 engage and embrace the positioning pins 16. This will precisely align the opening 22 of the receiving frame with the axis of the light beam projected from the lamp house 12. With the receiving frame thus positioned on the backing plate 8, the lamp house unit 12 may be lowered until the skirt 14 engages the frame whereupon, under the weight of the superposed unit 12, the frame will be securely clamped against the backing plate. As here shown, the side rails 17 are each provided with laterally extending projections 26 of arcuate peripheral contour to register with the overlying peripheral portions of the lamp house skirt 14 so as to contribute to the provisions of a light-tight joint between the lamp house unit and receiving frame. The arrangement shown is for accommodation of a circular type of lamp house but it will be obvious that variations may be made in the shape of the projections 26 to conform with rectangular or other forms of superposed structures.

With the receiving frame positioned and held between the backing plate and overlying lamp house unit, it will be noted that the recess bordered by the inner faces of the side and end rails 17 and 18 and the faces of the lip and web portions 21 and 19 respectively confronting the lower end face of the skirt 14, is open at one end which preferably parallels one of the side extensions of the frame holding the backing plate 8. In this recess is slidably engageable a negative or plate holder unit which preferably comprises a unitary rectangular base block 27 of light-impervious plastic material similar to that used in the construction of the receiving frame and provided with an aperture 28 which, when the plate holder is fully inserted in the recess, is capable of exact registration with the opening 22 of the receiving frame. As is best shown in Figure 5, one face of the base block 27 is provided with a recess 29 bordering the aperture 28 and extending, at one side of the latter completely across the face of the block to the adjacent side edge thereof. On the base block 27 is cemented or otherwise suitably attached a cover plate 31, of material equivalent to that of the base block, having an opening 32 therein duplicating and overlying the aperture 28 so that the portions of the cover plate bordering the opening form lips 33 overlying the corresponding marginal portions of the recess 29. One edge of the cover plate 32 is formed with a recess 34 so as to provide a relatively narrow bar along a side of the light transmission opening in the negative or plate holder unit which leaves a marginal section 37 of the recess 29 open so that a corresponding marginal portion of a film negative or plate inserted into the recess 29 is exposed and may be grasped by the operator's fingers and removed from the holder unit. To facilitate insertion of the said film negatives or plates into the holder unit recess, the sides 38 of the latter forming the transverse ends of the open section 37 are relatively convergently disposed toward the light transmission opening of the holder unit so that leading corners of the negatives or plates will be engaged and guided into the recess 29. In addition to being proportioned to receive the holder unit, the receiving frame recess is also sized to receive a standard cut film or plate holder so that photo copying as well as projection enlarging may be accomplished with the apparatus.

It will be seen that once the receiving frame is properly positioned between the focusing unit and the superposed lamp house unit it will not be necessary to disturb the frame during the subsequent operations of enlargement printing or copying. All that is required is successive removals and replacements of the holder unit or slide with, of course, the readily accomplished additional operation of negative or plate substitution in the holder unit recess 29. Thus, as in conventional devices of this character, it is not necessary to repeat the tiresome task of repeatedly raising and lowering the cumbersome lamp house unit between exposures with the attendant possibilities of light striking any sensitized paper which may be left exposed in the dark room or of disturbing focusing if the lamp house unit should be allowed to descend with considerable shock force against the subjacent focusing unit.

I claim:

In a photographic projection enlarger including superposed focusing and lamp house units movable relatively toward and from each other along a projection axis and one of which units has an apertured backing plate thereon provided with spaced locating pins, a receiver frame for insertion between said units and to be held thereby by the superposed weight of one unit on the other, said receiver frame having therein spaced recesses engageable with said locating pins for positioning said receiver frame in one direction relative to said backing plate and further having thereon a rib member engageable with a side of said backing plate for positioning the receiver frame relative to the backing plate in another direction, said receiver frame further having therein a light transmission aperture aligned with said projection axis, and a recess traversing said aperture and projection axis, and a copy carrier slidable in said recess into and out of said receiver frame and having a light transmission opening registrable with said light transmission aperture.

ORRIN DENNY, Sr.

REFERENCES CITED

The following references are of record in the file of this patent:

UNITED STATES PATENTS

| Number | Name | Date |
|---|---|---|
| 1,012,945 | Warner | Dec. 26, 1911 |
| 2,388,240 | Appling | Nov. 6, 1945 |
| 2,461,405 | Appling | Feb. 8, 1949 |